Oct. 5, 1937.  K. LÜRENBAUM  2,095,142
ELASTICALLY SUSPENDED TEST BENCH FOR TESTING VEHICLE ENGINES
Filed April 20, 1935    2 Sheets-Sheet 1
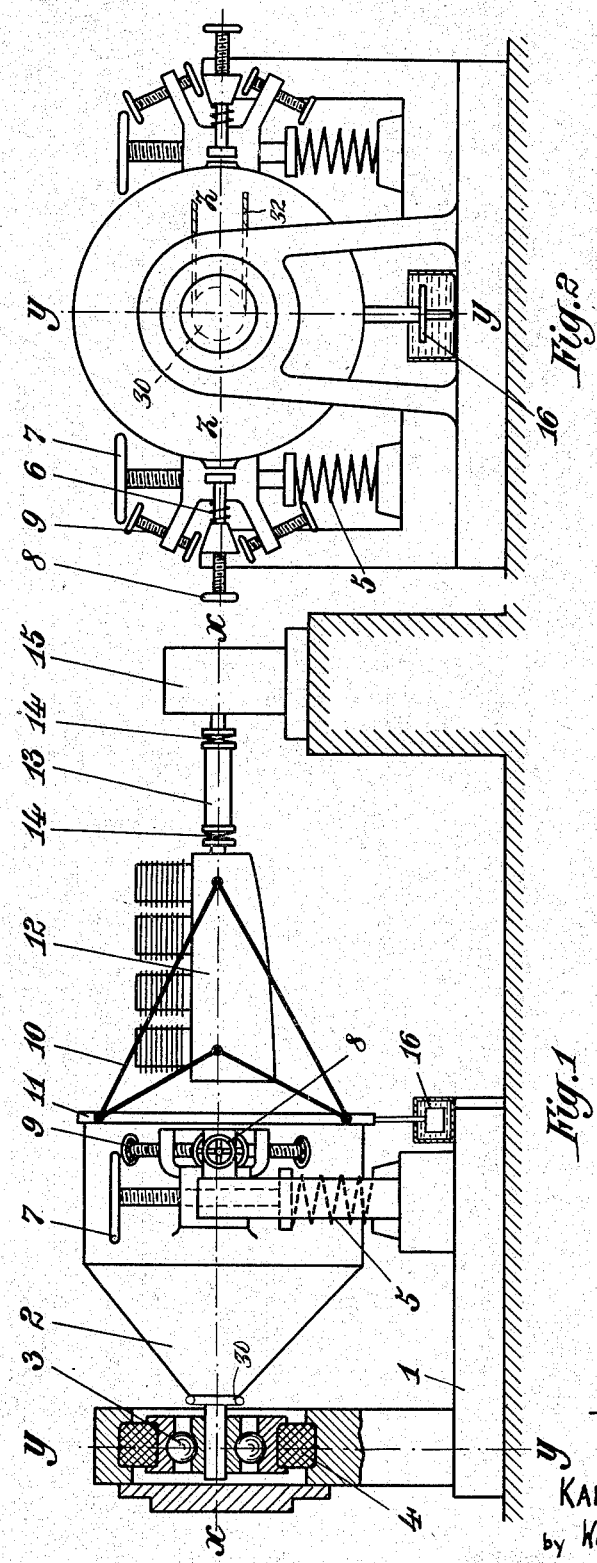
Inventor:
KARL LÜRENBAUM
by Walter S. Bleistein
ATTORNEY

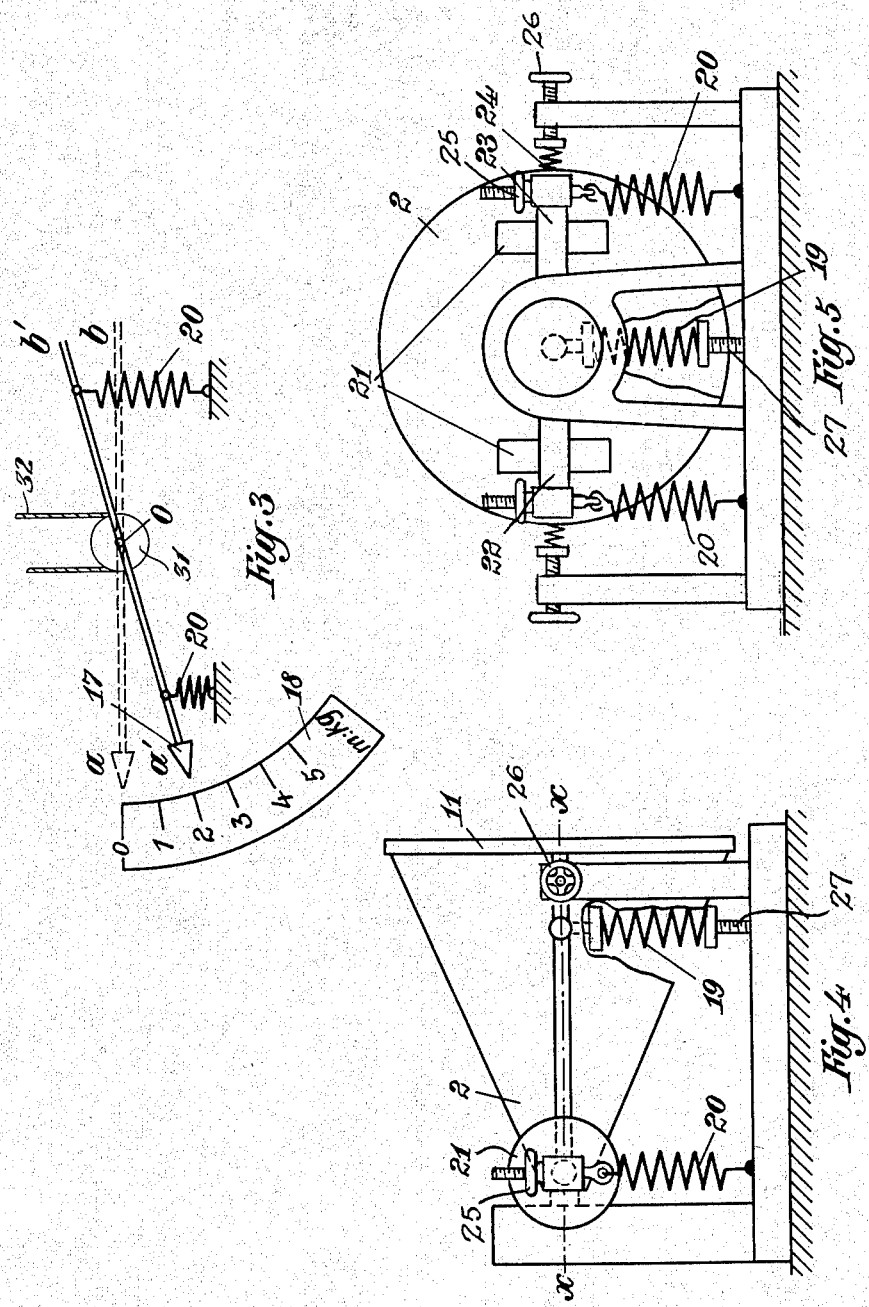

Patented Oct. 5, 1937

2,095,142

UNITED STATES PATENT OFFICE 2,095,142

ELASTICALLY SUSPENDED TEST BENCH FOR TESTING VEHICLE ENGINES

Karl Lürenbaum, Berlin-Adlershof, Germany

Application April 20, 1935, Serial No. 17,395
In Germany April 17, 1934

15 Claims. (Cl. 265—24)

This invention relates to an elastically suspended test bench for testing vehicle engines, particularly aircraft engines, and consists substantially in providing an engine bearer elastically supported relative to the foundation, whose mass and moments of inertia around the three principal axes are equal to the mass and moments of inertia of the wing cellule with the fuselage of the aeroplane or can be adapted by adjustable weights to the masses and moments of inertia of different types of aircraft and vehicles, and in arranging the engine bearer proper in a central bearing flexible on all sides and supporting it by springs relative to the firm foundation, so that the engine bearer is capable of carrying out free rotary oscillations in three planes and circular oscillations with the elastic central bearing as center, and that small parallel displacements in the three axial directions are possible, the frequencies of the natural oscillations in the three principal directions being below the low frequency of excitation developing in idling. The engine is secured to the bearer in a manner corresponding to the natural elasticity of the installation, possibly by using the installation itself. Further features of the invention will be disclosed in the specification below.

It is known in connection with testing work rigidly to secure vehicle engines to test bench frames arranged rigidly or elastically on the foundation. In view of the actual spring suspension of the engines in cushioned vehicles or freely floating airplanes, both method of attachment have provided to be unsuitable, since the test data thus obtained do not permit conclusions as to how the engines will actually behave in practical operation. The forces and moments of inertia due to the driving gear produce shaking oscillations of the engine, which, if the latter is elastically secured, are partially compensated within the engine as torsional and bending oscillations and partially transmitted to the cushioned vehicle or freely floating aeroplane. In the known kinds of suspension in an elastic installation in case of aeroplanes or, in motor vehicles, in the manner of the two or three point suspension stresses due to oscillation are known to remain within the elastic limits of the material and do not injuriously affect the engine. In this respect, rigid attachment of the engine, even on a spring test bench, is open to the objection that the oscillations of the engine are not compensated any more as elastic deformations of the casing or as shaking oscillations of the entire engine in elastic suspension with the result that incalculable additional stresses appear in the material and frequently lead to breakage of the casing, although the engines themselves would have endured without trouble in normal operation.

The invention overcomes these drawbacks and is illustrated, by way of example, in the accompanying drawings, in which Figure 1 is a side view of the test bench; Fig. 2, a transverse view thereof; Fig. 3, a diagram of the measuring device; and Figs. 4 and 5 are, respectively, a side and transverse view of another type of cushioning.

Referring to the drawings, 1 is the firm foundation of the test bench, in which a heavy drum 2 is arranged in a roller bearing 3. The outer ring of the roller bearing 3, by means of the elastic ring 4, is inserted in the foundation 1 so as to be flexible on all sides. At the front end, the drum 2 is supported in vertical and horizontal directions relative to the foundation 1 by means of the springs 5 and 6. The hand wheels 7 permit to readjust axis $x—x$ of the bench, when springs 5 are compressed under the load of the machine to be tested and/or of additional weights applied to the bench in order to adapt it to the mass and moments of inertia of a certain aircraft or vehicle. The adjustable stops 8 and 9 secure the construction against damage at too great strokes, and the damping mechanism 16 serves for reducing the shock-like impulses appearing during irregular operation to a tolerable degree.

The engine 12 is secured to the exchangeable fixing plate 11 by means of a standard installation 10 or a corresponding cushioning means. A brake 15 is connected with the engine 12 by means of a shaft 13 and two adjustable couplings 14.

In this way, the six possible degrees of freedom in practical flying work, that means the freedom of the craft to perform rotary movements about the three principal axes $x$, $y$ and $z$, and translatory movements in the direction of the axes $x$, $y$ and $z$ are reduced to the three essential ones, the forces and moments of inertia appearing in the three planes causing rotary oscillations of the drum 2 about the elastic central bearing 3, 4. In Figs. 1 and 2 respectively the three planes are indicated by the three axes $x$, $y$, $z$. The elastic arrangement of the central bearing 3, 4 permits the adjustment in the direction $x$ at greater deflections.

In the construction of the bearing 3, 4 shown, the $y—z$ plane is distinguished by the fact that at rotation about the axis $x$ the cushioning of the elastic ring 4 does not act. The torque appearing in this plane causes twisting of the test bench, which by means of a ball bearing can adjust itself without friction, so that the amount of twist may serve as measure of the engine output.

An indicating device such as pointer 17 opposite a fixed scale 18, as illustrated in Fig. 3 may be connected with the drum 2 by any suitable means to follow angular movements of the drum about the axis $x$—$x$. A cord-and-pulley drive may be used, for this purpose, one pulley 30 being rigidly connected to drum 2, and another pulley 31 to pointer 17, and the cord 32 being attached to both pulleys. Thus, on an angular movement of the drum in response to the torque, the pointer rotates likewise about point 0 for instance from its original position $a$—$b$ to the position $a'$—$b'$, so that the torque may be read directly on the scale 18 if the latter is gauged accordingly.

According to the type of cushioning shown in Figs. 4 and 5, the weight and the torque are taken up by separate sets of springs, the spring 19 taking up the weight of the drum 2 and the springs 20 serving for taking up the torque. The tension of springs 20 may be adjusted by means of hand wheels 25, and the position of drum 2 by means of screw 27 supporting spring 19, and by means of hand wheels 26 cooperating with springs 24. By means of the radially adjustable weights 21 adapted to slide on the rods 22, 23 the moment of inertia around the axis $x$ can be varied. By making use of additional weights the mass of the drum 2 may be varied. The springs 24 take up shocks in horizontal direction. If the cushioning is dimensioned so that the natural frequencies of the rotary oscillations in the three axial directions lie below the lowest frequency of excitation during idling of the engines to be tested, the impulses due to the forces and moments of inertia of the engine will be taken up in an extraordinarily soft manner without any danger of resonance phenomena.

The mass and the moments of inertia of the drum 2 about the three principal axes of oscillation are preferably chosen as large as the mass and moments of inertia of the aeroplane cell concerned. Variations in the moments of inertia can be easily effected in the manner described, and the actual conditions of practical flying can thus be imitated with respect to any engine on the test bench to an almost perfect degree.

The advantages afforded by the invention consist substantially in eliminating the difficulties connected with the operation of spring test benches. These difficulties are chiefly due to the fact that the six degrees of freedom possible in practical flying cannot be realized very well on a test bench without endangering safety in operation with respect to the coupling with the usual braking means, such as hydraulic or electrical brakes, etc. On the other hand, if the cushioning and the mass of the test bench are improperly dimensioned, undesirable resonance phenomena will appear and render practical operation impossible. For this reason, the invention reduces the six degrees of freedom of the flying aeroplane to the three essential ones, so that approximately the same conditions as prevail in practical flying are reproduced without lowering the safety in operation. Furthermore, by reducing the number of normally available degrees of freedom to three the design becomes extraordinarily clear. Oscillations can be readily coped with, so that the work can be done as in a rigid test bench with normal brakes. Owing to the universally elastic arrangement, no additional stresses as the result of shaking oscillations can affect the engine which thus cannot be damaged. By equalizing the mass and moments of inertia of the test bench and the corresponding values of the aeroplane cell actual flying conditions are closely imitated. The spring suspension also brings it about that the shaking oscillations coming from the engine cannot be transmitted to the foundation and thus to the ground. The test bench according to the invention is particularly suited for being erected on light foundations without causing the least trouble.

I claim:—

1. A test bench for engines of vehicles particularly of aeroplanes, comprising a substantially heavy bearer, means attached to said bearer for securing an engine thereto, and means for yieldingly supporting said bearer, adapted to permit limited movements of said bearer in all directions, the mass and the moments of inertia about the three principal axes of said bearer and said attached means being so dimensioned, that their natural frequencies in all directions are below those of the idling speed of the engine to be tested.

2. A test bench for engines of vehicles particularly of aeroplanes, comprising a substantially heavy bearer, means attached to said bearer for securing an engine thereto, means for yieldingly supporting said bearer adapted to permit limited movements of said bearer in all directions, and adjustable weights on said bearer, adapted to alter the mass and moments of inertia about the three principal axes of said bearer and said attached means whereby said mass and said moments of inertia may be made equal to those of the cellule and fuselage of an aeroplane for which the engine to be tested is destined.

3. A test bench for engines of vehicles particularly of aeroplanes, comprising a substantially heavy bearer, means attached to said bearer for securing an engine thereto, means for yieldingly supporting said bearer, adapted to permit limited movements of said bearer in all directions, the mass and the moments of inertia about the three principal axes of said bearer and said attached means being so dimensioned, that their natural frequencies in all directions are below those of the idling speed of the engine to be tested, and adjustable weights in connection with said bearer, adapted to alter the mass and moments of inertia about the three principal axes of said bearer and said attached means, whereby said mass and said moments of inertia may be made equal to those of the cellule and fuselage of an aeroplane for which the engine to be tested is destined.

4. A test bench for engines of vehicles particularly of aeroplanes comprising a frame, a substantially heavy bearer having an axis of torque, means attached to said bearer for securing an engine thereto, a bearing for said bearer near one of its ends, adapted to permit free angular movements of the bearer with respect to its axis of torque, yielding means attached to said frame for holding said bearing, adapted to permit limited movements of said bearing in all directions, and resilient means for supporting said bearer at a distance from said bearing, adapted to permit limited movements of said bearer in a plane at right angles to the axis of said bearing, whereby the bearer is permitted to perform free rotary oscillations in three planes at right angles to each other, and circular oscillations with the center of said bearing as the center of the oscillations, and to perform small translatory movements in the vertical, sideways and lengthwise directions.

5. A test bench for engines of vehicles particularly of aeroplanes comprising a frame, a substantially heavy bearer having an axis of torque, means attached to said bearer for securing an engine thereto, a bearing for said bearer near one of its ends, adapted to permit free angular movements of the bearer with respect to its axis of torque, yielding means attached to said frame for holding said bearing, adapted to permit limited movements of said bearing in all directions, and resilient means for supporting said bearer at a distance from said bearing, adapted to permit limited movements of said bearer in a plane at right angles to the axis of said bearing, whereby the bearer is permitted to perform free rotary oscillations in three planes at right angles to each other, and circular oscillations with the center of said bearing as the center of the oscillations, and to perform small translatory movements in the vertical, sideways and lengthwise directions, the mass and moments of inertia about the three principal axes of said bearer and said engine securing means being so dimensioned, that their natural frequencies in all directions are below the idling speed of an engine to be tested on the bench.

6. A test bench for engines of vehicles particularly of aeroplanes comprising a frame, a substantially heavy bearer having an axis of torque, means attached to said bearer for securing an engine thereto, a bearing for said bearer near one of its ends, adapted to permit free angular movements of the bearer with respect to its axis of torque, yielding means attached to said frame for holding said bearing, adapted to permit limited movements of said bearing in all directions, resilient means for supporting said bearer at a distance from said bearing, adapted to permit limited movements of said bearer in a plane at right angles to the axis of said bearing, whereby the bearer is permitted to perform free rotary oscillations in three planes at right angles to each other, and circular oscillations with the center of said bearing as the center of the oscillations, and to perform small translatory movements in the vertical, sideways and lengthwise directions, and adjustable weights in connection with said bearer, adapted to alter the mass and moments of inertia about the three principal axes of said bearer and said attached means, whereby said mass and moments of inertia may be made equal to those of the cellule and fuselage of an aeroplane for which the engine to be tested is destined.

7. A test bench as claimed in claim 4 in which said means attached to the bearer for securing an engine thereto comprise cushioning means corresponding to those as used in the mounting of such engine in a vehicle.

8. A test bench for engines of vehicles particularly of aeroplanes comprising a frame, a bearer having an axis of torque, means attached to said bearer for securing an engine thereto, a bearing yieldingly attached to said frame for supporting said bearer near one of its ends and adapted to permit said bearer to freely rotate about its axis of torque, springs in connection with said frame for supporting said bearer at a distance from said bearing and for counteracting a torque transmitted to said bearer, resilient means in connection with said frame for limiting lateral movements of said bearer, and indicating means in connection with said bearer for indicating angular movements of said bearer as a measure of a torque.

9. A test bench for engines of vehicles, particularly of aeroplanes comprising a frame, a substantially heavy bearer having a longitudinal axis, means attached to one end of said bearer for securing an engine thereto, a bearing for said bearer near its other end, yieldingly mounted on said frame and adapted to permit free oscillations of the bearer about its longitudinal axis, springs resting against said frame for supporting said bearer, laterally arranged springs engaging said bearer for counteracting a torque of said bearer, horizontally arranged springs for checking lateral movements of said bearer, and means in connection with said bearer for indicating angular movements of said bearer about its longitudinal axis as a measure for the torque to which the bearer is subjected.

10. A test bench for engines of vehicles, particularly of aeroplanes comprising a frame, a substantially heavy bearer having a longitudinal axis, means attached to one of its ends for securing an engine thereto, an anti-friction bearing for said bearer near its other end, said bearing including an outer race, an elastic ring attached to the outer race of said bearing and to said frame, whereby the bearing is capable of performing slight movements in all directions, resilient means between said frame and said bearer for supporting it and for counteracting torques of the bearer about its longitudinal axis, and means in connection with said bearer for indicating torques.

11. A test bench for engines of vehicles, particularly of aeroplanes comprising a frame, a drum-shaped bearer, an exchangeable covering plate secured to one end of said drum, means attached to said covering plate for securing an engine thereto, a bearing for said bearer near its other end, said bearing being yieldingly mounted on said frame, resilient means on said frame for supporting said bearer at a distance from said bearing and for counteracting torques transmitted to said bearer, resilient means on said frame for checking lateral movements of said bearer, and means in connection with said drum for indicating its angular movements about its longitudinal axis.

12. A test bench for engines of vehicles particularly aeroplanes comprising a frame, a substantially heavy bearer having a longitudinal axis, means attached to one end of the bearer for securing an engine thereto, a bearing for said bearer near its other end, said bearing being yieldingly mounted on said frame and adapted to permit free oscillations of the bearer about its longitudinal axis, springs mounted on said frame laterally of the longitudinal axis of the bearer for supporting said bearer and counteracting a torque transmitted thereto, horizontally arranged springs for checking lateral movements of said bearer, and adjustable weights in connection with said bearer, adapted to alter the mass and the moments of inertia about the longitudinal axis and about axes at right angles thereto, of said bearer and said attached means.

13. A test bench for engines of vehicles particularly of aeroplanes comprising a frame, a substantially heavy bearer having a longitudinal axis, means attached to one end of said bearer for securing an engine thereto, a bearing for said bearer near its other end, said bearing being yieldingly mounted on said frame and adapted to permit free oscillations of said bearer about its longitudinal axis, springs mounted on said frame laterally of the longitudinal axis of said bearer and at a distance from said bearing for supporting said bearer and for counteracting a torque transmitted thereto, horizontally arranged springs on said frame for checking lateral movements of said bearer, individual means for adjusting each of said springs whereby the zero position of the bearer may be adjusted.

14. A test bench for engines of vehicles particularly of aeroplanes comprising a frame, a substantially heavy bearer having a longitudinal axis, means attached to one end of said bearer for securing an engine thereto, a bearing for said bearer near its other end, said bearing being yieldingly mounted on said frame and adapted to permit free oscillations of said bearer about its longitudinal axis, a spring on said frame for supporting said bearer at a distance from said bearing, a pair of springs mounted on said frame laterally of the longitudinal axis of said bearer and at a distance from said bearing for counteracting a torque transmitted thereto, horizontally arranged springs on said frame for checking lateral movements of said bearer, individual means for adjusting each of said springs whereby the zero position of the bearer may be adjusted.

15. A test bench as claimed in claim 11 further comprising dampening means interposed between said bearer and said frame for reducing shock-like impulses of the bearer.

KARL LÜRENBAUM.